COORDINATE SELECTIVE SWITCH OPERATING MECHANISM

Filed July 30, 1948 3 Sheets-Sheet 1

GUNNAR BORGE KNÖS
INVENTOR

BY Fred M Vogel
AGENT

May 22, 1951 G. B. KNÖS 2,554,108

COORDINATE SELECTIVE SWITCH OPERATING MECHANISM

Filed July 30, 1948 3 Sheets-Sheet 2

G. BORGE KNÖS
INVENTOR

BY Fred M. Vogel
AGENT

May 22, 1951 G. B. KNÖS 2,554,108

COORDINATE SELECTIVE SWITCH OPERATING MECHANISM

Filed July 30, 1948 3 Sheets-Sheet 3

G. BORGE KNÖS
INVENTOR

BY Fred M Vogel
AGENT

Patented May 22, 1951 2,554,108

UNITED STATES PATENT OFFICE 2,554,108

COORDINATE SELECTIVE SWITCH OPERATING MECHANISM

Gunnar Börge Knös, Eindhoven, Netherlands, assignor to Hartford National Bank and Trust Company, Hartford, Conn., as trustee Application July 30, 1948, Serial No. 41,663
In the Netherlands September 19, 1947

2 Claims. (Cl. 179—27.54)

This invention relates to automatic telephone systems and relates to a so-called crossbar switch i. e. a multiple switch consisting of an assembly of elements arranged in groups and each of which comprises a fixed and a movable contact member and which are regularly located at the intersections of two rows of parallel lines of a plane. The directions of these parallel planes are designated X and Y.

The number of elements of a row in one direction usually exceeds that of a row in the other direction. The ratio depends on the frequency of calls to be expected. Hereinafter it is assumed that the number of elementary switches arranged in the row in the direction Y is $m$ and the number of elementary switches extending in a direction X is $n$, $n$ being equal to or exceeding $m$. The $m$ fixed contacts of each row in the direction Y may be connected to one another and to a supply conductor. In this case the $n$ movable contacts of each row in the direction X are also interconnected and connected to another supply conductor. This may, however, also be arranged conversely so that the $m$ movable contacts of each row in the direction Y and the $n$ fixed contacts of each row in the direction X are interconnected. In both cases there are two bunches of supply conductors of which one i. e. that of the incoming lines, comprises more wires than the other i. e. that of the lines passing farther into the exchange.

By operating the movable contact of one of the elements, one of the supply wires of one bunch is electrically connected to one of the supply wires of the other bunch. Several of these connections may be established simultaneously, but the arrangement is such that two connections cannot be established simultaneously by means of one and the same wire.

As a rule, the channel of a telephone connection comprises a plurality of wires which will be designated $p$. The $p$ elements serving for a connection, are joined to form a group which, in itself, constitutes another row either in the direction X or in a third direction Z. The movable contacts of each group of $p$ elements are simultaneously operated.

The movable contacts are operated by means of electro magnets. One block comprising $p$ rows extending in the direction Y and each comprising $m$ electrically interconnected elementary switches, is operated by one and the same magnet. The movement of the armature of the magnet is transmitted to the movable contacts by a catch, sometimes termed "ladder." All of the $p$ elements associated with the same channel have a common ladder. The combination consisting of a block of $m \times p$ elementary switches, $m$ ladders and a magnet comprising an armature is called a "bridge" and the magnet will be referred to as the bridge magnet. However, the ladders can be moved only if they are coupled to the armature of the bridge magnet. A ladder may be coupled to the armature of the bridge magnet by the movement of a bar member which extends in the direction X and is actuated by a magnet, called the bar magnet. One bar magnet is joined to each row of $n$ groups each consisting of $p$ elements in the direction X. Consequently there are $m$ bar magnets.

In the conventional crossbar switches two bar magnets co-operate in every instance with one bar, so that the number of bars is $m/2$. Such a bar consists of a metal rod, having a U-shaped section which is adapted to tilt about an axis parallel to the bar. The bar is adapted to occupy three positions. In its mid position all ladders with which it co-operates are decoupled. If one of the bar magnets associated with the bar is energised, this bar couples the ladders of all $n$ element groups of the row in the direction X, with which the energised bar magnet is associated, with the armatures of the bridge magnets. If subsequently one of the bridge magnets is energised, it actuates only that ladder of its bridge which is associated with the row concerned and closes the contacts of the $p$ elements associated with the same channel. Subsequently the bar magnet is de-energised and the bar resumes its mid position. The first connection being maintained, this bar may be used for a second connection. To this end the second bar magnet with which it co-operates, must be energised with the result that the bar tilts in the other direction and couples the ladders of a neighbouring row to the armature of the bridge magnets.

The invention relates to an improved crossbar switch. It is based on the realisation that the conventional crossbar switches exhibit the disadvantage that the bridge magnets serve to close the contacts. This involves the drawback that the number of these $n$ magnets, which must be energised throughout the conversation in order to keep closed the elementary switches of the call channel, usually considerably exceeds the number of bar magnets operating only for a short time for each conversation. The $m$ bar magnets need only perform little work. They must only bring the coupling pins into the operative position which requires much less force than is required for the pressing of the contacts or surmounting the opposing force of a spring by which the contacts are kept separated.

According to the invention the roles are reversed and the switch is constructed in such manner that for establishing a connection a bridge magnet is operative only for a short time, while establishing the coupling with a bar, whereas a bar magnet remains operative during the whole connection period and closes the elementary switches and keeps them closed.

The advantage obtained by this step consists in that the number of magnets per switch, which are required to be so strong as to be able to close the groups of elementary switches and keep them closed during the conversation, is much smaller than the number of magnets which is required to supply only little force and perform little work.

A cross bar switch may normally comprise 25 bridges and 10 bars. In this event the conventional switches would consequently require 25 strong magnets and only 10 magnets could be of smaller capacity. In contradistinction thereto a switch according to the invention requires in this case only 10 strong magnets, whereas 25 may be of smaller capacity.

The usual tilting bars with crossbar switches may be replaced by draw bars performing a rectilinear movement in their own direction. With the use of the invention this replacement is of still greater importance than if these draw bars serve only for coupling the ladders with the armature of the bridge magnet closing the contacts, since in a crossbar switch according to the invention the bars must exert a greater force than before.

With the use of drawbars a central pull magnet may furthermore be employed and as a bar magnet an auxiliary magnet may be added to each bar, the latter magnet serving for coupling the bar with the armature of the pull magnet.

According to the invention the magnet pulling the bar must have a higher capacity than in the known system, so that this centralisation is of much greater importance. In this event a crossbar switch having 25 bridges and 10 bars comprises only a single magnet capable of closing the contacts and in addition 35 small coupling magnets of which 10 are bar magnets and 25 bridge magnets.

It is desirable that upon establishing a connection the pull magnet should immediately be ready for establishing a following connection. This may be ensured by providing a latch which, when the armature of the pull magnet after having pulled a bar, resumes its position of rest, locks the bar and holds it as long as the bar magnet remains energised.

In order that the invention may be clearly understood and readily carried into effect it will now be explained more fully with reference to the accompanying drawing, given by way of example, which represents a crossbar switch according thereto and of the type in which the elementary switches consist of sets of springs and the interconnections of the movable contacts extend in the direction of the bars, so that those of the fixed contacts extends in the direction Y.

Figure 4:
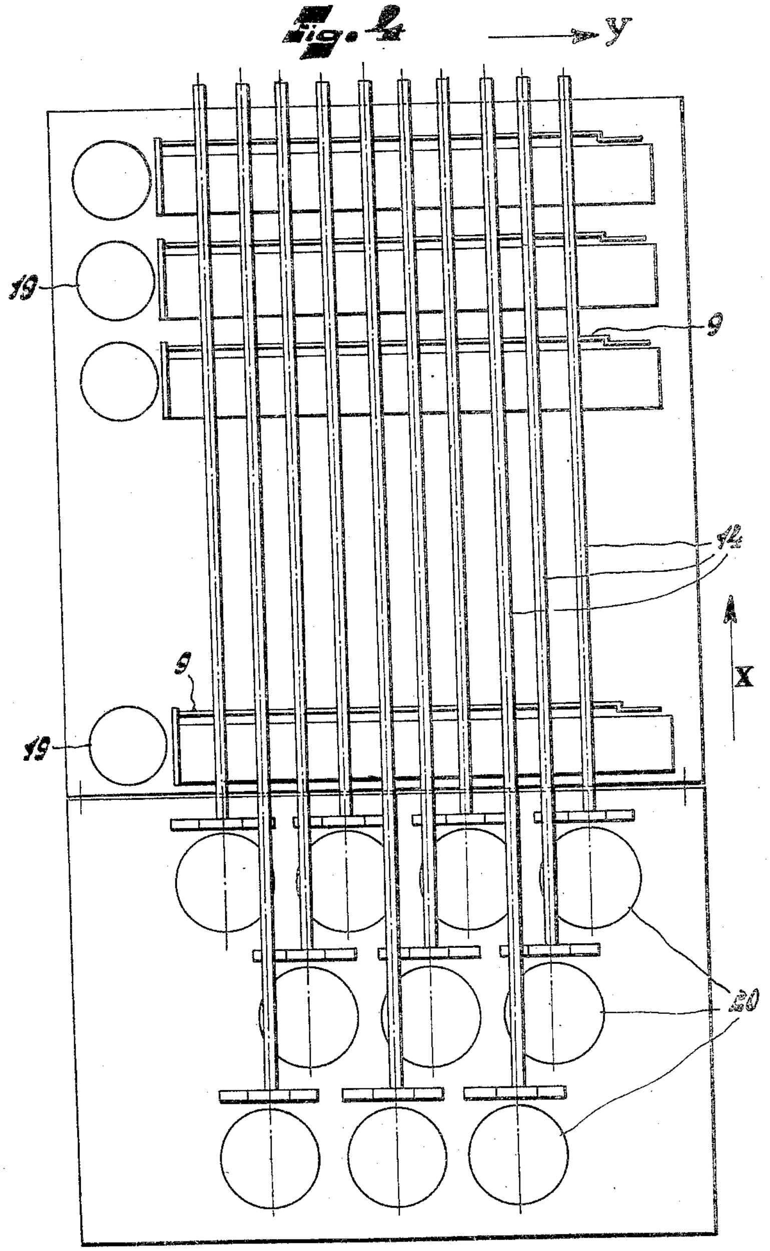

In Fig. 4 the whole switch is represented diagrammatically.

Figure 5:
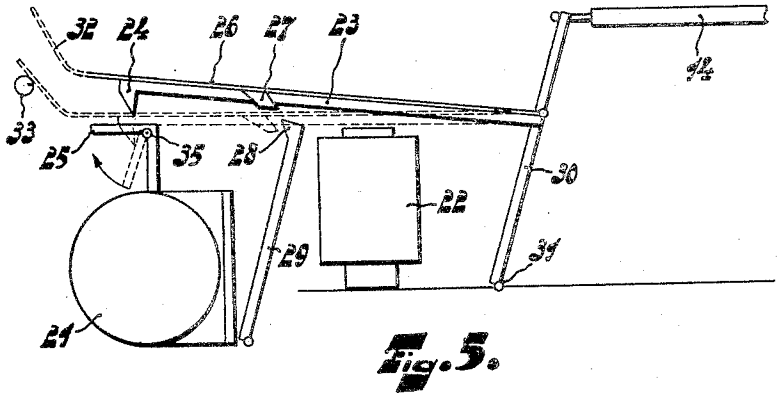
Figure 6:
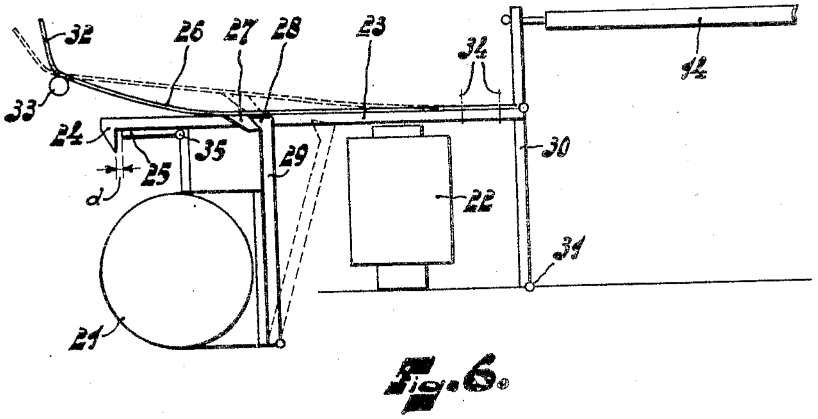

Figs. 5 and 6 represent diagrammatically a device comprising a central pull magnet and bar magnets only serving for coupling.

The elementary switches consist of a movable contact spring 1 provided with contact points 2 and a fixed contact piece 3 which is common to all corresponding elements of a bridge. The fixed contact pieces comprise a strip 4 of insulating material and a strip 5 of metal, for instance silver, of which the contact points 2 also may be made.

Figures 1, 2, 3:
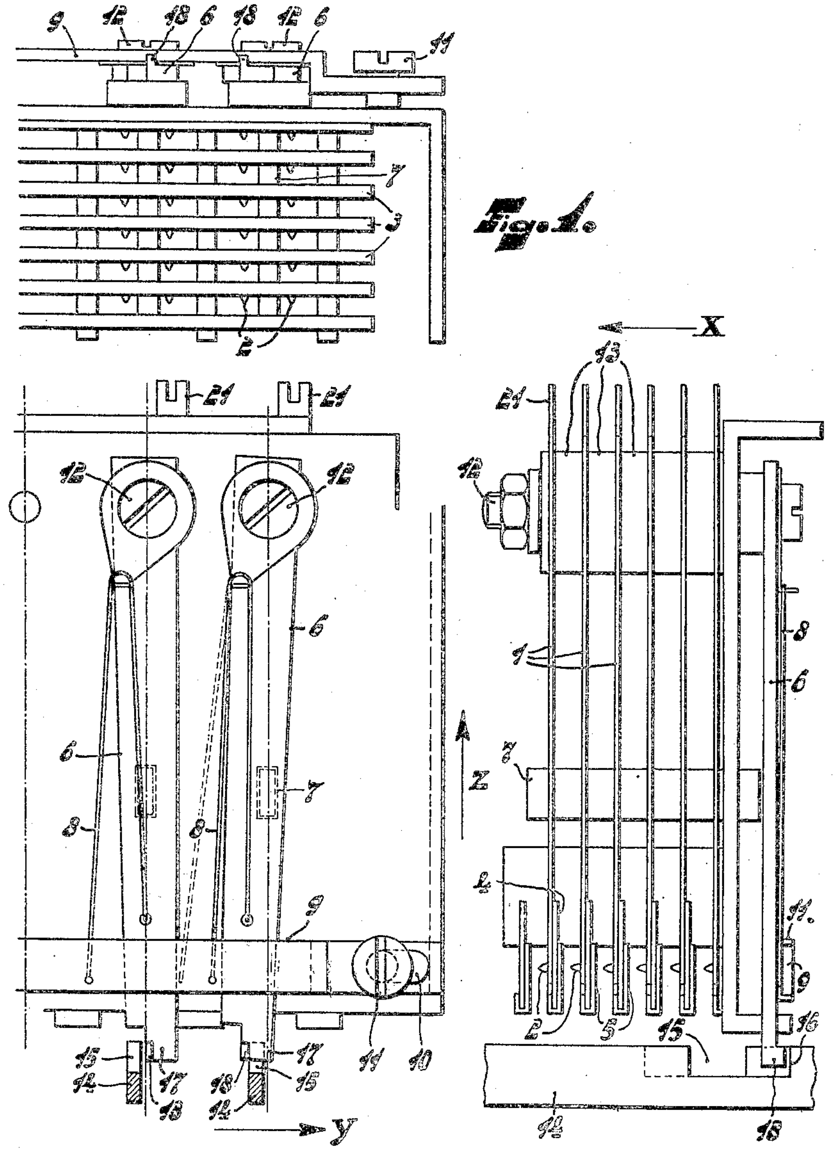
Fig. 1 is a projection in the direction Z and shows two groups of elementary switches.
Fig. 2 is a projection in the direction of the bar, the direction X and shows two catches with part of the armature of a bridge magnet.
Fig. 3 is a projection in the direction Y in which a set of springs in shown in side view.

To establish a connection the springs must be urged by a catch which comprises the driver 6 and the ladder 7 proper. Each driver 6 has secured to it a hairpin shaped spring 8, of which the end not anchored in the catch is connected to the armature 9 of a bridge magnet 19. This armature is of extended length and exhibits the shape of a drawbar. The end of this drawbar shown in Figs. 1 and 2 has formed therein a slot 10 through which a screw 11 passes. If the bridge magnet is energised the bar 9 in Figures 1, 2 and 4 is moved to the left. The slot 10 permits in this direction a small displacement of the bar 9 relatively to the screw 11. During this movement the end of the springs 8 which is connected to the bar 9 is pulled along and, through the intermediary of these springs, all drivers pivoting about a bolt 12. Alternatively, the drivers may be secured in a different manner provided that they are movable over a small distance in the direction of the bar 9. The bolt 12 serves at the same time to secure the set of springs. The contact springs of each set are separated from each other by insulating spacers 13. Each set comprises six contact springs: however, there may be more or less, the number depending upon the number of wires of each voice channel. Each bridge comprises, for instance, 10 groups of contact springs, and consequently 10 catches, of which two are shown adjacent each other in Fig. 2. The position of the third is also indicated in this figure. The whole switch may, for instance, comprise 25 bridges. Fig. 4 shows four of them.

When bridge magnet is energised, so that the lower end of the catches with which it co-operates (Fig. 2) is moved to the left (Fig. 2), the catches occupy a position in which they can be caught by the bar with which they co-operate. The bars are constructed as draw bars and are designated 14. In Fig. 2 they are shown in cross-section. If a bar is pulled by the associated bar magnet it will pull along that catch of the bridge, of which the bridge magnet is energised. The end of the driver 6 is, in effect, located in a recess 15 of the bar and when this bar, as shown in Fig. 3, is pulled to the left, the side 16 of this recess engages the front of the end 17 of the driver. Consequently the driver likewise moves to the left (in Fig. 2 rearwards) and the ladder 7 which in its turn is urged by the driver, urges all springs of one group simultaneously into their operative position.

The bridge magnet is now de-energised, but the contacts remain closed, because the driver is unable to resume its initial position as long as the bar is pulled, since this is prevented by a hook 18 which is secured to the driver and engages behind the edge 16 of the bar.

There is no objection to operation of a bridge magnet after one or more bars have been pulled. The drivers must not be coupled by these bars and the latter should not impede the movement of the armature 9 of the bridge magnet. For this reason the drivers 6 are not connected directly to the armature 9 but through the intermediary of springs 8. The drivers abut against the pulled bars, but the armature 9 moves on and stresses the springs 8 of the locked drivers.

To the projecting tags 21 of the contact springs wires may be soldered by which these contact springs are connected to the corresponding contact springs of the other bridges.

The $n$ bridge magnets 19 may be of much lighter construction than the $m$ bar magnets 20 which must perform a greater amount of work in comparison with the magnets 19. However, the bar magnets 20 may likewise be of a very light construction if a central pull magnet is provided for actuating all bars 14, and the bar magnets are used for coupling the bars with the armature of this powerful pull magnet.

An arrangement in which this is the case is represented in Figs. 5 and 6 which show a central pull magnet and a bar- or coupling magnet (in Fig. 5 both of them are de-energised and in Fig. 6 both are energised). In Fig. 5 the state in which the bar magnet is energised and in Fig. 6 the state in which the pull magnet is de-energised are indicated in dash lines.

The pull magnet is designated by 21, the bar or coupling magnet, by 22. The armature of the coupling magnet consists of a latch 23. When the bar is pulled it engages with a hook 24 behind a stop 25 by which the latch 23 is prevented from moving back. The latch has secured to it a coupling member 26 which is furnished with a hook 27 which is made to co-operate with the hook 28 of the armature 29 of the pull magnet (as indicated in dash lines in Fig. 5) by the bar magnet upon energisation thereof. When the magnet 21 is energised, the hook 27, the member 26 and the latch 23 are caused to follow.

The latch is pivoted to a lever 30 which is adapted to turn about a fixed point 31 and acts on the drawbar 14 which is consequently actuated by the magnet 21 by way of the latch 23.

Upon displacement of the latch the upstanding end 32 of the coupling member 26 abuts against a guide bar 33. However, this does not prevent its movement, since the member 26 which is secured to the latch 23 only at 34, is resilient so that the end 32 easily runs on the guide bar 33. The coupling hook 27 is held by the draw-hook 28 so that it remains in place and of the member 26 only the part between the hook 27 and the end 32 is curved (Fig. 6).

In order that the hook 24 of the latch is not prevented from descending by the stop 25 the latter is constructed as a valve which is pivoted at 35 and is lifted by the action of a spring. If the latch 23 with the hook 24 descends, it urges the valve 25 away and this occupies the position shown in dotted lines in Fig. 5. When the pull magnet has shifted the latch to a sufficient extent, the stop 25 rises and arrests the hook 24 (Fig. 6). Instead of the stop, the hook 24 may be collapsible and resilient. If the magnet 21 is de-energised, but the magnet 22 remains energised, the bar 14 maintains its active position, since the hook 24 is prevented from returning by the stop 25. In practice a small amount of play $d$ is unavoidable and should be tolerated by the springs 1 or the driver 6. However, this play results in that (unless steps are taken as in the embodiment shown), every time the armature of the pull magnet is attracted, all of the pulled rods must follow over a distance $d$ and the magnet must be much stronger than if it had to pull only one bar. For this reason the member 26 is resilient and the guide bar 33 is provided. As soon as the draw-hook 28 releases the coupling hook 27 owing to de-energisation of the pull magnet, the hook 27 is urged out of the path of the draw-hook 28 due to the resilience of the partly relaxing member 26 as indicated in dash lines in Fig. 6. Upon the next attraction of the armature of the pull magnet the pulled bar will consequently not be moved on even not over a distance $d$.

It is obvious that use may also be made of a coupling member which is non-resilient, but which is rotatable with respect to the latch 23. Therefor the fixed guide bar 33 must be replaced by a resilient stop which is capable of lifting the coupling member upon release of the hook 28 and which must be urged away by the force of the magnet 22.

Furthermore it will be appreciated that the invention may also be used in the system comprising filamentary contact members, in which the fixed contacts are interconnected in the direction of the bars. To this end the closing movement of the drivers 6 must be transmitted in the direction Z, since in this system the ladders move in the last-mentioned direction. To this end a tumbler may be provided between each driver and its ladder.

What I claim is:

1. In a coordinate type selector switch for use in automatic telephone systems, the combination comprising a plurality of movable operating bars, a common pulling electromagnet for actuating said bars and including an armature having a predetermined rest position in the condition where the electromagnet is de-energized and a predetermined operative position in the condition where the electromagnet is energized, a separate coupling electromagnet for each of said bars to selectively couple the related bar to the armature of said pulling electromagnet, and a latching member linked to each of said bars and controlled by the related coupling electromagnet, said member assuming a first position in the condition where said coupling electromagnet is de-energized and a second position in the condition where said coupling electromagnet is energized, said member being provided with coupling means which at the second position of said member engages said armature at its rest position whereby when said pulling electromagnet is energized the related bar is drawn by the member into its working position, said member being further provided with locking means for holding the related bar in its working position as long as the coupling electromagnet remains energized, the armature of the pulling magnet thereby being free to return to its rest position.

2. An arrangement, as set forth in claim 1, wherein said coupling means on said member is constituted by a flexible element having affixed thereto a first hook disposed to engage said armature in its rest position when said member is brought into its second position, whereby said member draws the related bar into its working position when the engaged armature is shifted into its operative position, a guide bar disposed to abut one end of said flexible element when said member draws the related bar into its working position, said first hook being urged by said flexible element out of engagement with said armature when said armature is released by the de-energization of the pulling electromagnet to assume its rest position, and wherein said locking means on said member is constituted by a second hook which engages a fixed stop when the member draws the related bar into its working position, said second hook being disengaged when said coupling electromagnet is de-energized.

GUNNAR BÖRGE KNÖS.

REFERENCES CITED

The following references are of record in the file of this patent:

UNITED STATES PATENTS

| Number | Name | Date |
|---|---|---|
| 1,472,503 | Taylor | Oct. 30, 1923 |
| 2,238,458 | Waller | Apr. 15, 1941 |
| 2,338,181 | Holden | Jan. 4, 1944 |
| 2,362,551 | Harrison | Nov. 14, 1944 |
| 2,447,010 | Harrison | Aug. 17, 1948 |